Aug. 25, 1959 V. K. KRIEBLE 2,901,099
PACKAGED METAL FASTENERS AND BONDING AGENT
Filed July 2, 1956
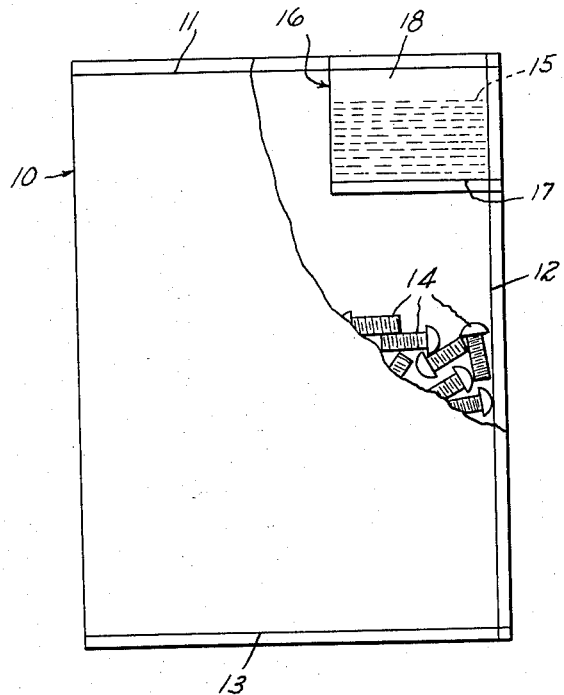
INVENTOR.
VERNON K. KRIEBLE
BY
Lindsey and Prutzman
ATTORNEYS United States Patent Office 2,901,099
Patented Aug. 25, 1959

2,901,099

PACKAGED METAL FASTENERS AND BONDING AGENT

Vernon K. Krieble, Hartford, Conn., assignor to The American Sealants Company, Hartford, Conn., a corporation of Connecticut Application July 2, 1956, Serial No. 595,300

11 Claims. (Cl. 206—47)

The present invention relates to metal fasteners and is concerned, more particularly, with a novel packaging arrangement for providing metal fasteners with a relatively quick setting resin coating.

Metal fasteners such as nuts and bolts, setscrews, tapered pins, wedges, clamps and the like are generally secured in place by the abutment or engagement of two relatively movable metal surfaces. In general, the effectiveness of the fastening or at least its tightness is greatly reduced if there is relative movement of the engaging metal surfaces after the fastener has been secured in place. This may be illustrated, for example, by the backing off of a nut on a bolt or the turning of a setscrew. Such backing off or loosening of the fastener will frequently occur in many installations, particularly where the installation is subject to vibration. Many expedients such as lock washers, interlocking pins including cotter pins, and complicated and expensive designs of the fasteners have been attempted to overcome this problem.

In accordance with the present invention it is proposed to overcome the problem by providing the fastener with a coating of a liquid bonding agent which will remain liquid for a sufficient period of time to permit assembly or installation of the fastener and which will set up relatively quickly to form a strong bond between the closely fitting metal surfaces after assembly or installation. This proposal presents a serious problem, however, because in general the bonding materials available for this purpose either will harden too rapidly prior to use, or do not harden properly between closely fitting metal surfaces, or are too sticky to handle conveniently. Therefore, it is an aim of the present invention to provide, in combination, a bonding agent which is not activated until it comes into contact with the fastener and to package the same with the fasteners in such a way that the bonding agent is kept separate from the fasteners but can be quickly and easily applied to the fasteners in the package at the time the fasteners are to be used.

By way of example, a specific embodiment of the present invention is illustrated in the accompanying drawing wherein the single view is a front view of a plastic bag partially in cross section to show the fasteners packaged therein and a separate frangible inner compartment for the bonding agent.

As indicated above, the term "metal fasteners" is used herein generically to indicate nuts, bolts, setscrews, tapered pins, wedges, clamps and the like having metal surfaces which are brought into engagement with other metal surfaces when the fasteners are installed. In the practice of the invention, the metal surfaces of the fasteners are preferably cleaned and degreased prior to packaging. With certain selected bonding agents, the metal of the metal fastener, itself, will act as an activator for the bonding agent and no further surface treatment is required. In other cases, a curing agent is applied to the surfaces of the fasteners prior to packaging.

The bonding agents which may be used in accordance with the invention are referred to herein generically as "uncured resin" by which is meant liquid or soluble solid compositions which are convertible by the action of catalysts to an insoluble infusible solid. In one embodiment of the invention, the uncured resin in liquid form, which is maintained separate from the fasteners in the original package, does not contain any catalyst and the catalyst is provided as a separate coating on the fasteners. In a second embodiment of the invention the uncured resin in liquid form may contain a catalyst but is not activated until it comes into contact with the metal of the fasteners or with an activator coating thereon. In a third embodiment of the invention the uncured resin is applied to the fasteners prior to packaging but the curing agent therefor is maintained separately in the original package.

In accordance with the invention, the fasteners which may or may not be surface treated to cause or accelerate curing of the resin, are placed in an outer container which is preferably liquid-proof. This is illustrated in the drawing as a sealed plastic bag 10 formed of a suitable tough sheet plastic material such as polyethylene which is folded and then heat sealed along the edges 11, 12 and 13. The fasteners are illustrated as a plurality of machine screws 14. An uncured resin indicated as the liquid 15 is contained within and separated from the screws 14 by an impermeable wall 16 which also is in the form of a plastic bag formed of a sheet of plastic material which is folded and heat sealed along the edges 11, 12 of the outer bag 10 and along its bottom edge 17. The inner wall 16 is formed of liquid-proof material and is frangible so that it can be easily ruptured from the outside without first opening the outer bag 10. A relatively thin sheet of polyethylene, for example, will adequately serve this purpose.

When it is desired to use the fasteners, the inner wall 16 is first ruptured to release the liquid therein and then the outer bag 10 is preferably manipulated to insure that all the fasteners are uniformly coated. This can be done conveniently, for example, by repeatedly inverting the bag 10 until all the fasteners are coated. If desired, the uncured resin liquid may be colored to make it easier to perceive when the coating operation has been completed. The fasteners may then be removed from the outer bag 10 as required and when the fasteners are installed the uncured resin coating will convert into an insoluble infusible solid effectively locking the fastener in assembled or installed position.

By way of specific example, the uncured resin utilized in accordance with the invention may be an acrylic acid type ester in combination with a peroxide catalyst. Since some of these mixtures of uncured resin and catalyst exhibit anaerobic properties, which is to say, they have the property of converting to an insoluble infusible solid in the absence of air, premature solidification is prevented by leaving an air space, as indicated at 18 in the inner container 16. The fasteners, if they have a ferrous metal surface, for example, require no separate treatment prior to packaging except for cleaning and degreasing. If the fasteners are formed of metals such as zinc or cadmium, however, or are coated with such metals, then it may be desirable to precoat the fasteners with an activator. Among the activators which are effective, for example, with uncured resins of the acrylic acid ester type are various heavy metal compounds which preferably are soluble in the uncured resin. Specific examples are ferric chloride and cobalt, manganese, lead, copper and iron "soaps" such as cobalt 2 ethyl hexoate, cobalt 2 ethyl butyrate, cobalt naphthanate, cobalt laurate, manganese 2 ethyl hexoate, manganese 2 ethyl butyrate, manganese naphthanate, manganese laurate, lead 2 ethyl hexoate, lead 2 ethyl butyrate, lead naphthanate, lead laurate, etc. and mixtures thereof. Various complexes of these compounds such as that formed by the addition of triethylamine or acetyl acetone to cobalt naphthanate are also effective.

The activator may be applied to the fasteners in a simple manner, such as by spraying, brushing or dipping the fasteners with a dilute solution of the activator, preferably in a volatile solvent. A solution containing no more than 1 to 10% activator is usually sufficient. After the solvent is evaporated the activator remains as a thin, relatively uniform coating on the fastener. Since it is preferred to degrease the fasteners prior to packaging, a simple and economical expedient is to apply the activator to the fastener by having the activator present in the degreasing solution. As little as 5% or less of activator in the degreasing solution will result in a satisfactory coating of activator on the fasteners to be packaged.

In the event that the uncured resin plus the catalyst to be utilized therewith cannot be premixed without causing the resin to polymerize in a relatively short period of time and thus would not have a satisfactory shelf life, it is proposed, in accordance with the invention, to place the uncured resin in the inner container 16 without any catalyst admixed therewith and to provide the catalyst as a precoating on the fasteners. In some instances, it may be preferred to reverse this procedure and pretreat the fasteners with the uncured resin and place a solution of the catalyst in the container 16. The following are given by way of specific example of various classes of resins and catalyst groups where the latter arrangement would be utilized: an uncured polyester resin with or without conventional accelerators and a peroxide catalyst to promote room temperature curing; an unsaturated maleic alkyd resin dissolved in a copolymerizing monomer such as styrene and a peroxide catalyst; an uncured epoxy resin and a dibasic acid catalyst such as phthalic acid or an amine catalyst such as ethylenediamine; an uncured alkyd resin and a diisocyanate catalyst such as toluene diisocyanate; phenolic one stage (Resole) resin and a strong acid such as toluene sulfonic acid; and high boiling monomers such as diallyl phthalate or diallyl maleate with a peroxide catalyst.

The method of precoating the fasteners with the catalyst is not critical. A simple procedure is to spray the fasteners or tumble the same in contact with a liquid catalyst or solution of the catalyst. The fasteners may be packaged wet or the coating may be permitted to dry on the fasteners prior to packaging. A suitable binder may be added, if desired, to increase adherence of the catalyst to the surface of the fasteners.

So long as the inner wall 16 is intact, the uncured resin without catalyst will remain relatively stable. When the fasteners are to be used, the inner wall 16 is first ruptured and the uncured resin is permitted to come into contact with the fasteners and catalyst coating thereon as previously described. The fasteners are thus conditioned for use and the resin will form a good bond upon assembly or installation of the fasteners.

A package of fasteners and bonding agent prepared in accordance with the present invention has a long shelf life and may be stored for long periods of time without appreciable change of condition. After the inner wall 16 is ruptured and the contents are permitted to coat the fasteners, the uncured resin coating on the fastener is conditioned to cure and form a bond and the fasteners must be used before curing takes place. Depending upon the ingredients selected, the curing time may be as little as a few hours or as much as a few weeks.

It is an advantage of the invention that only a very small quantity of resin is required to provide an effective bonding agent for the fasteners. For example, a package containing 1000 machine screws of No. 5—44 x ½" size may be effectively coated with as little as 5 cc. of the uncured resin.

As used herein the term "curing agent" is intended to include activators, accelerators and catalysts, all of which may promote curing of the uncured resin.

While the invention has been described particularly in connection with the use of a package comprising an inner and outer plastic bag, it will be realized that other available forms of containers containing a separating wall or capsule may be substituted without departing from the essence of the invention.

Any variations and modifications of the invention which are apparent to one skilled in the art are intended to be included within the scope of the invention.

I claim:

1. A package containing metal fasteners and a frangible wall within the package enclosing a relatively stable liquid uncured resin which will cure in contact with the metal fasteners, said wall, while intact, preventing contact of the uncured resin with the metal fasteners.

2. A package as defined in claim 1 wherein the liquid uncured resin is an anaerobic composition and an air space is provided in contact therewith.

3. A package as defined in claim 1 wherein the fasteners are coated with a curing agent for the liquid uncured resin.

4. A package as defined in claim 3 wherein the curing agent is a catalyst for the uncured resin.

5. A package as defined in claim 3 wherein the curing agent is an activator comprising a heavy metal compound.

6. A package comprising an outer plastic bag containing metal fasteners and an inner frangible plastic container enclosing a relatively stable liquid uncured resin which will cure in contact with the metal fasteners, said inner frangible plastic container, while intact, preventing contact of the uncured resin with the metal fasteners.

7. A package comprising an outer plastic container containing metal fasteners and an inner container formed of plastic containing an air space and an anaerobic uncured resin consisting essentially of an acrylic acid type ester and a peroxidic catalyst.

8. The package defined in claim 7 wherein the inner and outer containers are formed of polyethylene.

9. A package containing metal fasteners and an inner container formed of plastic containing air and an anaerobic uncured resin consisting essentially of an acrylic acid type ester and a peroxidic catalyst, said fasteners having a coating of an activator for the uncured resin comprising a heavy metal compound soluble in the resin.

10. A package comprising an outer plastic bag containing metal fasteners and a frangible inner compartment containing a liquid uncured resin, said fasteners being coated with a curing agent for the uncured resin, and said frangible inner compartment, while intact, preventing contact of the uncured resin with the metal fasteners and the curing agent.

11. A package comprising a container formed of polyethylene, a frangible wall in the container separating the same into two compartments, a plurality of metal fasteners in one compartment, and a quantity of an anaerobic uncured resin in liquid phase in the other compartment, said frangible wall, while intact, preventing contact of the uncured resin with the metal fasteners.

References Cited in the file of this patent

UNITED STATES PATENTS

| | | |
|---|---|---|
| 940,593 | Hardman | Nov. 16, 1909 |
| 2,321,414 | Parker | June 8, 1943 |
| 2,666,354 | Dim et al. | Jan. 19, 1954 |
| 2,690,879 | Snyder | Oct. 5, 1954 |
| 2,714,974 | Sawyer | Aug. 9, 1955 |